(12) United States Patent
Matsui et al.

(10) Patent No.: US 8,501,665 B2
(45) Date of Patent: Aug. 6, 2013

(54) METHOD FOR MANUFACTURING FILM CATALYST

(75) Inventors: Kunio Matsui, Tochigi (JP); Masayasu Sato, Tochigi (JP); Yoshimi Yamashita, Tochigi (JP)

(73) Assignee: Kao Corporation, Tokyo (JP)

( * ) Notice: Subject to any disclaimer, the term of this patent is extended or adjusted under 35 U.S.C. 154(b) by 237 days.

(21) Appl. No.: 12/935,948

(22) PCT Filed: Apr. 3, 2009

(86) PCT No.: PCT/JP2009/057298
§ 371 (c)(1),
(2), (4) Date: Dec. 1, 2010

(87) PCT Pub. No.: WO2009/123363
PCT Pub. Date: Oct. 8, 2009

(65) Prior Publication Data
US 2011/0065569 A1  Mar. 17, 2011

(30) Foreign Application Priority Data

Apr. 4, 2008 (JP) ................................. 2008-098333
Mar. 31, 2009 (JP) ................................. 2009-084049

(51) Int. Cl.
| | |
|---|---|
| B01J 21/04 | (2006.01) |
| B01J 23/02 | (2006.01) |
| B29D 11/00 | (2006.01) |
| B29C 67/20 | (2006.01) |
| B29C 43/22 | (2006.01) |
| B29C 53/00 | (2006.01) |
| B29C 55/00 | (2006.01) |
| B29C 59/00 | (2006.01) |
| B29C 63/00 | (2006.01) |
| B28B 1/00 | (2006.01) |
| B28B 3/00 | (2006.01) |
| B28B 5/00 | (2006.01) |
| B28B 7/36 | (2006.01) |
| B28B 7/38 | (2006.01) |
| B28B 21/00 | (2006.01) |
| C04B 33/32 | (2006.01) |
| C04B 33/36 | (2006.01) |
| C04B 35/64 | (2006.01) |
| B31F 1/20 | (2006.01) |
| B32B 3/00 | (2006.01) |
| B32B 7/12 | (2006.01) |
| B32B 15/00 | (2006.01) |
| B32B 15/04 | (2006.01) |
| B32B 15/14 | (2006.01) |
| D02G 3/00 | (2006.01) |
| A01J 21/00 | (2006.01) |
| A01J 25/12 | (2006.01) |
| A21C 9/04 | (2006.01) |
| A23G 1/20 | (2006.01) |
| A23G 1/22 | (2006.01) |
| A23G 3/00 | (2006.01) |
| A23P 1/00 | (2006.01) |
| A47J 43/20 | (2006.01) |

(52) U.S. Cl.
USPC . 502/439; 502/523; 502/527.19; 502/527.22; 502/527.24; 264/2.3; 264/175; 264/285; 264/286; 264/510; 264/546; 264/642; 264/667; 442/232; 428/59; 428/351; 428/354; 428/379; 425/89; 425/90; 156/719

(58) Field of Classification Search
USPC .......... 502/439, 523, 527.19, 527.22, 527.24; 264/2.3, 175, 285, 286, 510, 546, 642, 667; 442/232; 428/59, 351, 354, 379; 425/89, 425/90; 156/719

See application file for complete search history.

(56) References Cited

U.S. PATENT DOCUMENTS

| | | | | | |
|---|---|---|---|---|---|
| 3,163,689 | A | * | 12/1964 | Ives ............... | 264/510 |
| 3,536,561 | A | * | 10/1970 | Griffiths ............ | 156/205 |
| 3,773,588 | A | * | 11/1973 | Bodycomb ........... | 156/205 |
| 4,193,793 | A | * | 3/1980 | Cheung ............... | 75/235 |
| 4,567,630 | A | * | 2/1986 | Ishida et al. ......... | 29/6.2 |

| | | | |
|---|---|---|---|
| 5,011,810 A | | 4/1991 | Michimoto et al. |
| 5,599,509 A | * | 2/1997 | Toyao et al. ............... 422/180 |
| 6,412,701 B1 | | 7/2002 | Kohama et al. |
| 6,710,013 B1 | * | 3/2004 | Kato et al. ............... 502/439 |
| 2008/0004472 A1 | | 1/2008 | Nishimura et al. |

FOREIGN PATENT DOCUMENTS

| | | | |
|---|---|---|---|
| EP | 0362448 A1 | | 4/1990 |
| EP | 1738826 A1 | | 1/2007 |
| EP | 2072130 A1 | | 6/2009 |
| JP | 59-215220 A | | 12/1984 |
| JP | 60-111726 A | | 6/1985 |
| JP | 63-190649 A | | 8/1988 |
| JP | 63-296844 A | | 12/1988 |
| JP | 2-99144 A | | 4/1990 |
| JP | 3-275146 A | | 12/1991 |
| JP | 08-141393 | * | 6/1996 |
| JP | 8-141393 A | | 6/1996 |
| JP | 2000-189814 A | | 7/2000 |
| JP | 2001-331776 A | | 11/2001 |
| JP | 2003-245723 A | | 9/2003 |
| WO | WO 93/24229 A1 | | 12/1993 |
| WO | WO 2005/035122 A1 | | 4/2005 |

OTHER PUBLICATIONS

International Preliminary Report on Patentability and Written Opinion of the International Searching Authority dated Nov. 30, 2010 for Application No. PCT/JP2009/057298 (PCT/IB/373 and PCT/ISA/237).

International Search Report dated Jul. 14, 2009, issued in PCT/JP2009/057298.

Extended European Report for Application No. 09727047.4 dated Aug. 31, 2012.

* cited by examiner

*Primary Examiner* — Patricia L Hailey (74) *Attorney, Agent, or Firm* — Birch, Stewart, Kolasch & Birch, LLP (57) ABSTRACT

The present invention provides a method for manufacturing a film catalyst, including forming a catalyst layer on one side or each side of a base material to obtain a film catalyst, bending the film catalyst, and optionally cutting the film catalyst, wherein the bending step is conducted by bending the film catalyst with a bending tool composed of two gears that are oppositely arranged as meshing each other while a protective material having a compressibility of 40 to 95% is inserted between the catalyst layer of the film catalyst and the two gears.

5 Claims, 2 Drawing Sheets

Closest distance between two gears, T=0

(b)

Closest distance between two gears, T=0

Fig. 3

METHOD FOR MANUFACTURING FILM CATALYST

FIELD OF THE INVENTION

The present invention relates to a method for manufacturing a film catalyst suitably used in gas-liquid reactions and the like.

BACKGROUND OF THE INVENTION

A film catalyst including a film-shaped base material and a catalyst supported thereon is known (WO 2005/035122). The film catalyst may be processed into a wave or honeycomb shape in order to increase a surface area. Unfortunately, a processor used in processing may cause troubles such as generation of wrinkles in a catalyst layer supported on the base material and partial detachment of the catalyst through the contact of the processor with the film catalyst.

JP-A 8-141393 describes a method of processing catalytic members, including sandwiching a metal base material having a catalyst layer between soft plate members, passing the sandwich between a pair of synthetic resin gears to give a wave shape, and heating the metal base material. In this patent, examples of the soft plate member include high-quality paper and polyethylene resin. In some cases, use of such a plate member cannot sufficiently relax a stress on the catalyst layer in an irregular space defined by teeth of gears, resulting in a damaged catalyst layer. Moreover, in the irregular space, a stress on the catalyst layer and the plate members increases and a stress loading on the synthetic resin gears also increases to impair durability of the gears. If the plate member gets wrinkles during running, a total thickness of the plate member in the wrinkle part substantially increases and the catalyst layer is subjected to very high stress to inevitably break mechanically. As described above, the method has many problems.

JP-A 2000-189814 describes a method of press-molding a catalyst-applied material including cloth or mesh of an inorganic fiber and a catalyst component applied thereon with a molding apparatus including a heat molding die, wherein the mold has a porous layer with flexibility on the surface thereof.

SUMMARY OF THE INVENTION

The present invention provides a method for manufacturing a film catalyst, including forming a catalyst layer on one side or each side of a base material to produce a film catalyst and then bending the film catalyst, wherein the bending step is conducted by bending the film catalyst with a bending tool composed of two gears that are oppositely arranged as meshing each other while a protective material having a compressibility of 40 to 95% is inserted between the catalyst layer of the film catalyst and the two gears.

The method for manufacturing a film catalyst, wherein a ratio of the total thickness ($t_2$) of the protective material 11 to the thickness ($t_1$) of the film catalyst, a ratio of $t_2/t_1$, is 4 to 20, and a distance (T) between the two gears and $t_1$ and $t_2$ satisfy a relationship $t_1 < T < t_1 + t_2$, wherein T is a distance between the two gears wherein the closest distance of two gears in the state of a tooth of one gear meeting a gap of the other gear is set to the basing point 0.

The present invention also provides a method for manufacturing a film catalyst, including steps of forming a catalyst layer on one side or each side of a base material to obtain a film catalyst and bending the film catalyst by pressing, wherein the bending step is conducted by bending the film catalyst with a bending tool, provided with upper and lower bending plate-like tools having corrugated teeth on flat plates, oppositely arranged for convex parts of the teeth to mate with concave parts, while a protective material having a compressibility of 40 to 95% is inserted between the catalyst layer of the film catalyst and the bending tool.

DETAILED DESCRIPTION OF THE INVENTION

According to JP-A2000-189814, the porous layer provided on the surface of the mold controls abrasion of the metal of the mold itself, but is difficult to have strength and durability by itself. In mold processing, a stress on the mold and the porous layer may be particularly focused on the interface therebetween to cause detachment of the porous layer from the mold. As thus, the metal layer is difficult to be stably fixed on the metal of the mold, or is difficult to have durability sufficient for use in molding. When the porous layer is composed of an acrylic rubber or the like, the porous layer has a problem that a high coefficient of friction thereof may produce a frictional force on the catalyst-applied material to break the material.

The present invention provides a method for manufacturing a film catalyst processed into a desired shape without impairing a catalyst layer.

According to the method of the present invention, a film catalyst can be produced in a desired shape without impairing a catalyst layer.

The method for manufacturing a film catalyst of the present invention is applicable for manufacturing various film catalysts used in organic syntheses.

In the present invention, the protective material preferably has a coefficient of dynamic friction of 0.05 to 0.25, or is preferably a nonwoven fabric.

(1) First Method of Manufacturing

<Steps for Manufacturing a Long Film Catalyst>

In a first step, a catalyst layer is formed on one side or each side of a long base material to obtain a long film catalyst. The first method of manufacturing is suitable for processing a long film catalyst, but also applicable to process a piece of film catalyst having a desired shape one by one.

(Step of Preparing a Coating Composition)

A coating composition used in manufacturing of the long film catalyst can be prepared as follows.

The coating composition comprises a powder catalyst. The powder catalyst may be a catalytic active material or a catalytic active material supported on a porous material The catalytic active material may be of any component if it is effective for a reaction applied. Examples of the catalytic active material include Ag, Au, Cu, Ni, Fe, Al, transition metal elements of Period IV, platinum group elements, Group 3A elements in the periodic table, metal elements such as alkaline metals and alkaline earth metals, and metal oxides thereof.

The porous material serves as a catalyst carrier for supporting the catalytic active material. Examples of the porous material include activated charcoal, alumina, silica, zeolite, titania, silica-alumina, and diatomaceous earth. These materials may be used alone or in combination. The porous material having the higher surface area is more preferably used. Molecular sieves may also be used.

For supporting the catalytic active material on the catalyst carrier, general known methods such as an impregnation, a co-impregnation, a co-precipitation, and an ion-exchange method may be applied.

The powder catalyst preferably has an average particle diameter of 0.01 to 500 μm, more preferably 0.5 to 150 μm, and even more preferably 1 to 50 μm. A distribution of particle diameters is preferably narrow. Further, the powder catalyst preferably has a specific surface area according to the BET method of 1 to 500 m$^2$/g, more preferably 5 to 200 m$^2$/g, and even more preferably 10 to 100 m$^2$/g.

In the coating composition, a percentage of the powder catalyst in the total solid content (100% by mass) is preferably 60 to 90% by mass, more preferably 60 to 85% by mass, and even more preferably 70 to 85% by mass.

A binder used in the coating composition preferably has high binding properties among the powder catalyst and to the surface of the carrier, is durable in a reaction environment, and has no adverse effect on a reaction system. Examples of the binder include cellulose resins such as carboxy methyl cellulose and hydroxyethyl cellulose; fluororesins such as polytetrafluoroethylene and poly(vinylidene fluoride); and various thermoplastic resins and thermosetting resins such as polyvinyl alcohol, urethane resin, epoxy resin, polyamide resin, polyimide resin, polyamideimide resin, polyester resin, phenol resin, melamine resin, and silicone resin. These resins may increase molecular weights by cross-linking with a hardener. Among these resins, preferred are thermosetting resins such as phenol resin, furan resin, and epoxy resin, and more preferred are thermosetting resins that cures accompanied by condensation.

When the thermosetting resin is used as the binder, the coating composition has increased coating strength and binding properties due to increased cross-linking density by curing, and provides a porous catalyst coating due to condensation. The porous catalyst coating will effectively bring out a catalytic activity of the powder catalyst.

When the film catalyst prepared by the first method of manufacturing is used in a reaction of an alcohol with a primary or secondary amine to produce a tertiary amine, examples of a preferred combination of the powder catalyst and the binder include a combination of a copper-nickel-ruthenium ternary catalyst in a powder form and a phenol resin.

In the coating composition, a percentage of the binder in the total solid content (100% by mass) is preferably 10 to 40% by mass, more preferably 15 to 40% by mass, and even more preferably 15 to 30% by mass.

Use of the powder catalyst and the binder at given percentages described above allows to control an exposure degree of the powder catalyst, will bring out an original catalytic activity of the powder catalyst, and can improve falling-off resistance of the catalyst layer.

When a percentage of the binder in the solid content is not more than 40% by mass, a thickness or a covering ratio of the binder over the surface of the powder catalyst is appropriate. In such conditions, the powder catalyst can fully exhibit its catalytic activity to provide high catalytic activity. When a percentage of the binder in the solid content is not less than 10% by mass, the powder catalyst can fully exhibit its catalytic activity, and binding force of the powder catalyst—the powder catalyst and the powder catalyst—the base material increases to prevent departure and partial falling-off of the catalyst layer in the manufacturing of the film catalyst and during reaction operation.

The coating composition comprises, in addition to the powder catalyst and the binder, a solvent for improving wetting properties of the surface of the powder catalyst and for solving the binder to facilitate mixing and homogenizing the composition.

Any solvent may be used if it has no adverse effect on the catalytic activity of the powder catalyst. The solvent selected may be water-soluble or insoluble and of any type, according to the binder used. A porous structure of the film catalyst can be controlled by selection of the solvent. The solvent preferably well dissolves the binder. Two or more solvents may be used together. The solvent appropriately selected for the binder used can control a porous structure of the catalyst layer.

Examples of the solvent include water; alcohols such as methyl alcohol, ethyl alcohol, isopropyl alcohol, butyl alcohol, and allyl alcohol; ketones such as acetone, methylethylketone (MEK), and methylisobutylketone (MIBK); glycols and derivatives thereof such as ethylene glycol, propylene glycol, diethylene glycol, polyethylene glycol, polypropylene glycol, diethylene glycol monoethyl ether, polypropylene glycol monoethyl ether, polyethylene glycol monoallyl ether, and polypropylene glycol monoallyl ether; glycerols and derivatives thereof such as glycerol, glycerol monoethyl ether, and glycerol monoallyl ether; ethers such as tetrahydrofuran and dioxane; hydrocarbons such as liquid paraffin, decane, decene, methylnaphthalene, decalin, kerosine, diphenylmethane, toluene, dimethylbenzene, ethylbenzene, diethylbenzene, propylbenzene, cyclohexane, and partially hydrogenated triphenyl; silicone oils such as polydimethylsiloxane, partially octyl-substituted polydimethylsiloxane, partially phenyl-substituted polydimethylsiloxane, and fluorosilicone oil; halogenated hydrocarbons such as chlorobenzene, dichlorobenzene, bromobenzene, chlorodiphenyl, and chlorodiphenylmethane; fluorinated oils such as DAIFLOIL (Daikin Industries, Ltd.) and Demnum (Daikin Industries, Ltd.); ester compounds such as ethyl benzoate, octyl benzoate, dioctyl phthalate, trioctyl trimellitate, dibutyl sebatate, ethyl (meth)acrylate, butyl (meth)acrylate, and dodecyl (meth)acrylate; and others such as dimethylformamide, N-methyl-pyrrolidone, acetonitrile, and ethyl acetate.

The coating composition may comprise, in addition to the components above, surfactants and coupling agents as a dispersion aid, inorganic particles and fibrous materials as an aggregate, solvents having high boiling point as a pore-making aid. The coupling agent has effects of cross-linking an inorganic filler and an organic polymer matrix at the interface therebetween to improve physical properties.

Generally known coupling agents can be used, including silane coupling agent, titanate coupling agent and aluminate coupling agent. Two or more coupling agents may be used in combination. The coupling agent may be diluted in a compatible organic solvent to control a concentration.

The fibrous material used may be organic or inorganic fibers. Examples of the organic fiber include polyamide fibers such as nylon6, nylon66, and aramid fiber, polyvinyl alcohol fibers, polyester fibers such as polyethylene terephthalate, polybutylene terephthalate, and polyarylate fibers, and poly(vinylindene chloride)-, poly(vinyl chloride)-, polyacrylonitrile-, and polyolefin-polyethylene and polypropylene fibers. The organic fibers also include recycled organic fibers such as cellulose rayon and cellulose acetate fibers. Examples of the inorganic fiber include glass fiber, carbon fiber, activated carbon fiber and ceramic fiber. Addition of such fibers provides effects of aggregation to increase mechanical strength of the catalyst layer.

The coating composition can be prepared by any method of homogeneously mixing without specific limitation. In the present invention, the coating composition is preferably prepared with a media mill or a paint shaker. The above-described components constructing the coating composition can be homogeneously processed with a media mill by its structure and mechanism. It is suitable to control particle diameters and a dispersion state of the powder catalyst and control a distribution of pore diameters of the catalyst layer of the film catalyst.

Examples of the media mill include ball mill, attritor, AD mill, twin AD mill, basket mill, twin basket mill, handy mill, Glenn mill, Dyno mill, Apex mill, star mill, Visco mill, sand grinder, and paint shaker with beads. In the present invention, other dispersing apparatus than the media mill can be used, including a dissolver-type mixing and dispersing apparatus.

The solid content in the coating composition influence formation of a porous structure of the catalyst layer formed, which structure is formed during desorption of the solvent from the catalyst layer, and is preferably 10 to 80% by mass, more preferably 20 to 70% by mass, and even more preferably 25 to 65% by mass. A viscosity of the coating composition is selected within an appropriate range according to a method of application, and is generally 5 to 10,000 mPas, preferably 20 to 5000 mPas, and more preferably 50 to 1000 mPas.

(Manufacturing of a Film Catalyst)

On a long base material, the coating composition is applied to form a film, thereby manufacturing a catalyst intermediate. The catalyst intermediate may be then dried (aged) at ambient temperature. For application, various conventional known methods can be employed, including blade, roll, knife, bar, spray, dip, spin, comma, kiss, gravure, and die coating methods. For forming a magnetic layer on the base material, PDV and CVD as well as application may be used.

The film catalyst preferably has a thickness of the catalyst layer of not more than 500 μm, more preferably not more than 100 μm, and even more preferably not more than 50 μm. An amount of the catalyst supported per unit area is preferably 0.5 to 100 $g/m^2$, more preferably 1 to 60 $g/m^2$, and even more preferably 10 to 30 $g/m^2$.

The long base material used in the present invention is of a long shape or a sheet shape. A length and a width are not specifically limited, but a thickness is preferably not more than 1 mm.

Examples of a material of the base material include copper foil, stainless-steel foil, and aluminum foil. From the points of processability and corrosion resistance, preferably used are copper foil and stainless-steel foil.

Furthermore, from the viewpoint of increasing adhesion of the catalyst layer to the base material, the surface of the base material is preferably subjected to roughening treatment or coupling treatment. The coupling treatment can use the coupling agent described above, and preferably the same coupling agent to that used in preparation of the coating composition.

After the coating composition is applied on the base material to form a film, a step of drying and curing is performed in order to remove the solvent and unreacted monomers in the coating composition. In some cases, curing accompanies drying during a drying process. Curing may be partially conducted simultaneously with drying by regulating a heating temperature and/or a heating time according to ingredients of the coating composition.

The step of drying and curing is preferably performed in a hot atmosphere of the air, water vapor, or an inert gas such as nitrogen and argon, or with blowing such a heating medium. The step may also be performed by means of radiation heat of infrared and far infrared rays and induction current heat by electromagnetic waves. These means may be combined. The step may also be performed by natural drying (air-drying) at ambient temperature. Components to be removed in the step include volatile components mainly composed of the solvent and a cured product. The volatile components include other components such as unreacted monomers.

Conditions for drying and curing must be adjusted according physical properties of the binder and the volatile matters mainly composed of the solvent in the coating composition. Selection of the solvent and set of conditions for drying and curing allow controlling a porous structure (pore volume) of the catalyst layer. When drying is performed by blowing the hot air, the higher drying temperature and the higher blowing volume are used, the faster the components can be removed from the catalyst layer, resulting in the larger porous structure (the larger pore diameter and the higher pore volume). The lower blowing volume is used, the smaller porous structure can be produced.

The porous structure is determined in desorption of the volatile components mainly composed of the solvent, in formation of a cross-linking structure (networking structure) through curing and cross-linking reaction, and if condensation occurs, in desorption of a condensed product.

In the step of drying and curing, employed are a method and conditions for drying that do not affect adversely on an original catalytic activity of the powder catalyst used in the present invention.

In the present invention, typical conditions of drying and curing by hot-air blowing to produce an intended film catalyst are: a temperature of 60 to 400° C., preferably 70 to 250° C., and more preferably 80 to 150° C.; preferably a wind velocity of 0.5 to 30 m/sec, and more preferably 1 to 20 m/sec; and preferably a period for not less than one second, more preferably not less than 10 minutes, and even more preferably not less than 30 minutes.

When only drying is intended without curing, immediately after the coating composition is applied on the support, the coating composition is preferably dried. In this drying, the porous structure of the coating can be controlled by controlling drying conditions. The shorter time from the formation of the catalyst layer on the support to desorption of the volatile components mainly composed of the solvent is thus more preferred, preferably not longer than 2 hours, more preferably not longer than 30 minutes, and even more preferably not longer than 5 minutes.

In the present invention, when the binder contains a thermosetting resin, it is preferable to process, into a certain shape, a catalyst intermediate still containing an uncured material (in the state of prepolymer) in the catalyst layer that has been prepared by coating and drying and treat it by final heat treatment.

A treatment of drying and curing of the catalyst intermediate before the final heat treatment may be terminated at the state of an uncured material remaining in the thermosetting resin. The thermosetting resin preferably partially cures sufficient for handling the film catalyst in processing and increases shape retention and mechanical strength of the catalyst layer from the point of formation of the film. The volatile components may remain in the layer at the order of several percent.

In drying before the final heat treatment to produce an intended film catalyst, typical conditions for drying by hot-air blowing are: a temperature of 60 to 400° C., preferably 70 to 250° C., and more preferably 80 to 150° C.; at a wind velocity of preferably 0.5 to 30 m/sec, and more preferably 1 to 20 m/sec; and a period preferably for 0.5 to 300 seconds, and more preferably 1 to 100 seconds.

<Step of Bending a Long Film Catalyst>

Figure 1:
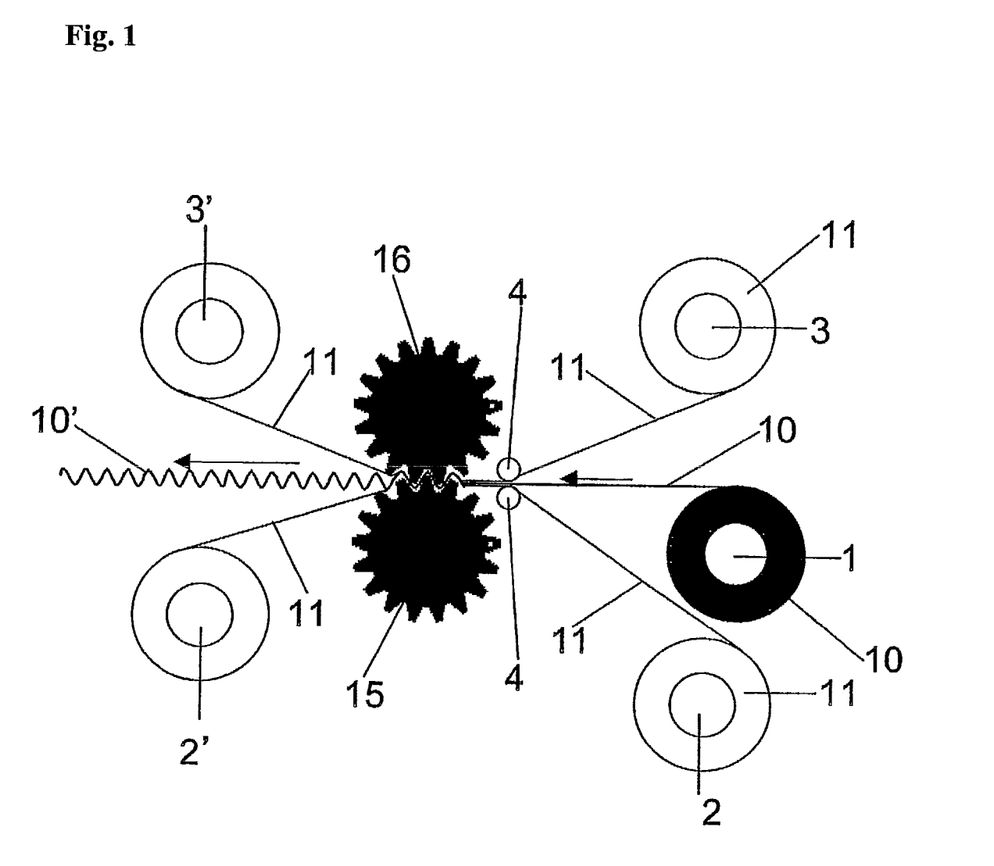
FIG. 1 shows a schematic diagram illustrating the method of manufacturing of the present invention.

Next, a step of bending a long film catalyst is described in reference with FIG. 1. FIG. 1 shows a schematic diagram illustrating the step.

The long film catalyst 10 prepared in the previous step is wound on a feeding roll 1, and sequentially runs out in the direction of an arrow from the feeding roll 1. The long film catalyst 10 has a catalyst layer on one side or each side.

On each of feeding rolls 2 and 3, a protective material 11 is wound and runs out parallel to the long film catalyst 10 running out from the feeding roll 1. The protective material 11 may be of single layer, or double or more layers. Use of two or more layers of the protective material produces slippage of two layers between gears 15 and 16 in bending to reduce a friction force acting on the sheets. The use also provides a space between two protective material layers to increase an apparent compressibility, which preferably reduces a stress on the film catalyst in bending.

As shown in FIG. 1, a direction of the protective material 11 running out from the feeding roll 3 is deflected to a different direction on the way with a supporting roll 4. When the long film catalyst 10 has the catalyst layer only at one side, the protective material 11 may be fed only at the side contacting with the catalyst layer, or may at both sides.

A feeding rate of the feeding roll 1 is same to or faster than that of feeding rolls 2 and 3. For example, the feeding rate is within the range from 0.5 to 50 m/min.

A width of the protective material 11 is same to or slightly wider than that of the long film catalyst 10. A ratio of the total thickness ($t_2$) of the protective material 11 to the thickness ($t_1$) of the long film catalyst 10, $t_2/t_1$, is preferably 4 to 20, and more preferably 4 to 12.

The thickness (t1) is the total thickness of the catalyst layer (when the film catalyst has catalyst layers on both sides of the base material, the sum of thicknesses of the base material, one catalyst layer, and the other catalyst). The thickness (t2) is the total thickness of the protective material(s) used in bending (when the film catalyst has catalyst layers on both sides of the base material, the sum of thicknesses of two protective material layers, and when two layers per side of the base material are used in bending, the sum of thicknesses of four protective material layers).

The protective material 11 has a compressibility of 40 to 95%, preferably 50 to 95%, and more preferably 70 to 95%, as measured by the method described in Examples. The protective material 11 having the compressibility within the range can disperse a stress on the catalyst layer from the gear through compression of the protective material 11, and can prevent generation of wrinkle and falling-off of the catalyst due to damage of the catalyst layer of the long film catalyst 10 in bending.

Even if the protective material 11 has got wrinkled, the protective material 11 becomes substantially thinner through compression in a space defined by gears meshing each other, thereby preventing damage of the catalyst layer caused by local stress concentration on the catalyst layer.

The protective material 11 preferably has a coefficient of dynamic friction of 0.05 to 0.25, more preferably 0.05 to 0.2, and even more preferably 0.1 to 0.2. The protective material 11 having the coefficient of dynamic friction within the above shown range is prevented from damaging the catalyst layer because it slips on the surface of the film catalyst 10 (the surface of the catalyst layer) when a force is applied in the state where the long film catalyst 10 is in contact with the protective material 11 during the bending step. In other words, even if the protective material has high compressibility, when it is hardened with deformation, it will damage the catalyst layer. The protective material having a small coefficient of dynamic friction is thus preferably used for reducing a direct function on the catalyst layer.

The protective material 11 preferably has a porosity of not less than 50%, more preferably 80 to 98%, and even more preferably 90 to 98%. The protective material having the porosity within this range may be easily compressively deformed by itself.

In bending with gears in the presence of the protective material therebetween, the film catalyst is stressed in the state of being sandwiched between the protective materials in spaces between the gears. When a protective material, having the porosity within the range as above and being easy to be compressively deformed, for example a nonwoven fabric sheet composed of fibers, is used and is stressed for processing into a shape, the protective material (nonwoven fabric sheet) is compressed and distances among fibers are reduced functionally to control an increasing stress on the film catalyst and alleviate local concentration of stress, because of having a void structure among filaments. From the viewpoint of achieving the effects, the protective material used in the present invention preferably has voids therein.

When the protective material composed of fibers has small porosity, fibers contact and cross each other at many points. Although such a protective material has voids among fibers, it is compressively deformed with fibers deforming to substantially reduce voids, and does not exhibit the effect of alleviating a stress in bending. A general film material such as a polyethylene resin described in JP-A8-141393 has very small porosity and exhibits no effect of alleviating a stress in processing to damage the catalyst layer. A high quality paper described in JP-A 8-141393 really has voids among cellulose fibers. However, an amount of voids is small, cellulose fibers composing the protective material are not deformed or moved, and the protective material does not exhibit the effect of alleviating a stress with becoming thinner by compression.

The protective material 11 is preferably made of nonwoven fabric. A material of the nonwoven fabric is not specifically limited. Nonwoven fabrics of known single fiber material, such as PET, PE, and PP, made from two or more kinds of fiber materials or a fiber having a sheath/core structure, may be used.

The long film catalyst 10 is sandwiched between layers of the protective material 11 and passed between two gears 15 and 16 oppositely arranged as meshing each other. In this time, each space between two gears 15 and 16 and the long film catalyst 10 has a layer of the protective material 11.

For two gears 15 and 16, those made of metals such as iron and stainless-steel may be used. Use of such gears 15 and 16 allows easier bending and provides longer useful life of gears due to better abrasion resistance, compared with use of gears having synthetic resin teeth as in JP-A8-141393. In addition, bending may be performed with heated gears.

For two gears 15 and 16, for example, a spur gear may be used. A spur gear having a circular pitch (a value of a circumferential length of a pitch circle of the gear divided by the number of teeth) of 2 to 20 mm and a tooth depth of 1 to 20 mm may be used in bending.

As described above, the long film catalyst 10 is passed between two gears 15 and 16 to be formed into a long film catalyst 10' having a wave shape. The long film catalyst 10' is run out in the direction of an arrow by a delivery action of two gears 15 and 16. Two layers of the protective material 11 are each wound on winding rolls 2' and 3'.

A sheet (e.g., a square sheet) of the film catalyst is bent one by one, for example, by inserting a square sheet of the film catalyst one by one into a space between two gears 15 and 16 to bend or placing square sheets of the film catalyst on the protective material 11 running out from the feeding roll 2, optionally by temporary fixing, and continuously feeding them to bend. The latter case needs no cutting step.

In the step of bending, each space between the long film catalyst 10 and two gears 15 and 16 has one layer of the protective material 11 having the specified compressibility. The catalyst layer of the long film catalyst 10 is thus prevented from damaging even under strong stress from gears 15 and 16, and the long film catalyst 10 can be bent into a desired shape.

Figure 2:
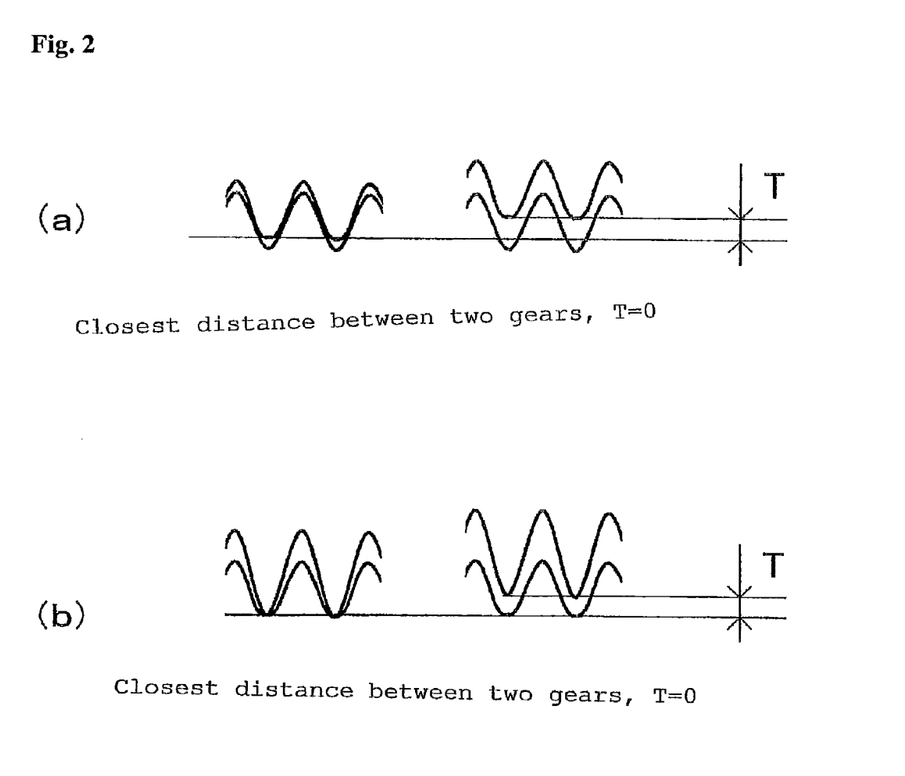
FIG. 2 shows a partial enlargement of view illustrating a distance of gears shown in FIG. 1.

A distance (T) between two gears 15 and 16 meshing each other (see, FIG. 2) and $t_1$ and $t_2$ described above satisfy a relationship $t_1<T<t_1+t_2$. In the conditions satisfying the relationship, the film catalyst is kept to be closely attached to the protective material between two gears, and can run out with being formed along the shape of gears in good condition through compression of the protective material. The long film catalyst 10 is thus well bent in a shape-imparting operation, and the catalyst layer thereon is difficultly damaged. As used herein, T refers a distance between two gears in which the closest distance of two gears in the state of a tooth of one gear meeting a gap of the other gear is set to the basing point 0.

<Step of Cutting>

Figure 3:
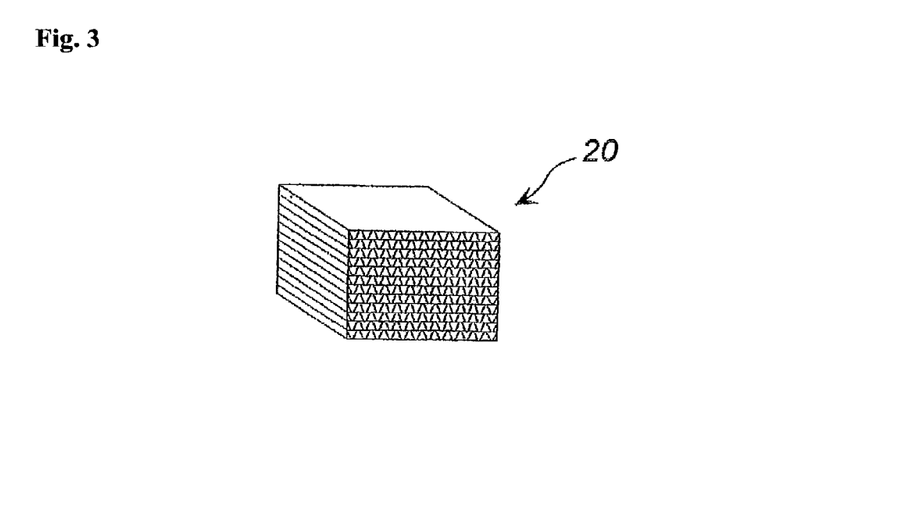
FIG. 3 shows a perspective illustration of a catalyst assembly including a film catalyst manufactured by the method of the present invention.

The long film catalyst 10' having a wave shape prepared in the previous step is cut into a desired shape and size. Cut pieces may be combined, for example, to form a catalyst assembly 20 as shown in FIG. 3, and used as the assembly.

(2) Second Method of Manufacturing

Next, another embodiment of a method of manufacturing different from the first method of manufacturing is described. The method of manufacturing of this embodiment comprises pressing a film catalyst one by one.

The film catalyst used may be similarly prepared to the first method of manufacturing, but the post-process of cutting, as required for the long film catalyst in the first method, is unnecessary because the film catalyst is prepared in advance to have a desired shape and size.

In a step of bending, two bending plate oppositely placed are used. Two bending plate are made of metal. The upper bending plate has convex and concave parts on a plate to form a wave profile. The lower bending plate has convex and concave parts on a plate to form wave teeth, mating the concave and the convex of the upper plate on a plate.

First, a protective material is placed on teeth of the lower bending plate. On the protective material, the film catalyst (having a catalyst layer on each side or one side) having a desired shape and size is stacked, and covered with an additional protective material. Next, the film catalyst is pressed with the upper bending plate over the protective material to obtain the film catalyst processed into a wave shape. A method of pressing with two bending plates arranged sideways may also be used.

The protective material is same to that described in the first method of manufacturing, and may prevent the catalyst layer on the film catalyst from being damaged in bending.

The film catalyst produced by the second method of manufacturing can be used for organic synthesis and applied for various reactions by varying the catalyst. The film catalyst may be applied for gas phase, liquid phase, and liquid reaction systems. Examples of the reaction for that the film catalyst is applicable include oxidation of olefin, oxidation of alcohol, isomerization of olefin, isomerization of aromatic compound, carbonylation, and hydrogenation of ester, and preferably dehydrogenation and hydrogenation. A combination of a powder of copper-nickel-ruthenium ternary catalyst and a phenol resin as a binder is particularly suitable for the reaction of an alcohol with a primary amine or secondary amine to produce a tertiary amine accompanied by dehydrogenation and hydrogenation.

BRIEF DESCRIPTION OF THE DRAWINGS

In figures, 10 is a long film catalyst, 10' is a long film catalyst having a wave shape, 11 is a protective material, and 15 and 16 each are a gear.

EXAMPLES

The present invention has been described above with reference to preferred embodiments thereof, but not limited by these embodiments. The following Examples demonstrate the present invention. Examples are intended to illustrate the present invention and not to limit the present invention.

(1) Compressibility

A compressibility was measured as follows, according to the method described in "Normalization and analysis for textile evaluation (Fuuaihyouka no hyoujyunnka to kaiseki)", second edition, Textile Machinery Society of Japan, Hand Evaluation and Standardization Committee, 1980, Jul. 10. For measuring, a measuring instrument KESFB3-AUTO-A (trade name, Kato Tech Co., Ltd.) was used.

A test piece of 20 cm by 20 cm was prepared and mounted on a test stand of a measuring device. The test piece was compressed between copper plates each having a circular area of 2 cm² at a compression velocity of 20 μm/sec with a maximum compression load of 59 kPa. A compressibility was determined by the following formula.

$$\text{Compressibility}(\%)=(T_0-T_m)/T_0\times100$$

wherein, $T_0$ refers a thickness of a test piece under a load of 49 Pa, and $T_m$ refers a thickness of a test piece under a maximum load of 59 kPa.

(2) Coefficient of Dynamic Friction (MIU)

A coefficient of dynamic friction was measured as follows, according to the method described in "Normalization and analysis for textile evaluation (Fuuaihyouka no hyoujyunnka to kaiseki)", second edition, Textile Machinery Society of Japan, Hand Evaluation and Standardization Committee, 1980, Jul. 10. For measuring, a measuring instrument KESFB3-AUTO-A (trade name, Kato Tech Co., Ltd.) was used.

A test piece of 20 cm by 20 cm was prepared and mounted on a test stand of a measuring device. To the test piece was press-bonded a contact at a contact surface with a force of 49 cN. The test piece was horizontally moved 2 cm at a constant velocity of 0.1 cm/sec with a uniaxial tension of 19.6 cN/cm. The contact includes 20 piano wires each having a diameter of 0.5 mm and bended into a U shape at a width of 10 mm. The contact surface of the contact was press-bonded to the test piece with a plumb bob at a force of 49 cN.

A value of μ (coefficient of friction) represented by the formula (i):

$$\mu=F/P \quad (i)$$

wherein, F represents a friction force [N], and P represents a load of the contact [N], varies over a time of move of the contact on the surface of the test piece. A coefficient of dynamic friction (MIU) is thus determined by the formula (ii):

$$MIU=(1/L\max)\int_0^{L\max} \mu dL \quad (ii)$$

wherein, L represents a length of move of the contact on the surface of the test piece, and Lmax represents a maximum length of move (=2 cm).

(3) Thickness

A thickness of a protective material was measured in accordance with JIS L 1096 under conditions of a measuring element of 25.2 mm in diameter, a load of 0.343 N, and a measuring pressure of 0.7 kPa.

(4) Porosity

An apparent density $\rho L$ of a protective material is represented by:

$$\rho L = Bw/te \times 10^{-3} \text{ (g/cm}^3)$$

wherein, to is a thickness of the protective material (mm), and Bw is a basis weight of the protective material (g/m²).

Accupyc II 1340 (Shimadzu Corporation) was used. A protective material was placed in a stainless-steel cell having a inner diameter of 18.5 mm, a length of 39.5 mm, and a volume of 10 cm³, and measured for the volume thereof by varying a pressure of helium. A measured volume and a weight of the sample were used to calculate a density pr of the protective material.

Two densities thus obtained were used to determine a porosity Rv (%) of the protective material by the formula:

$$Rv = (1 - \rho L/\rho r) \times 100 (\%)$$

EXAMPLES AND COMPARATIVE EXAMPLES

Manufacturing Example 1

Manufacturing of Powder Catalyst

A catalytic active material of copper-nickel-ruthenium ternary system was supported on a synthetic zeolite to prepare a powder catalyst as follows.

A 1 L flask was charged with a synthetic zeolite (average particle diameter: 6 μm) and then an aqueous solution of copper nitrate, nickel nitrate, and ruthenium chloride at a molar ratio of metal elements of Cu:Ni:Ru=4:1:0.01. The mixture was stirred and heated. To this was added an aqueous solution of 10% by mass of sodium carbonate dropwise at 90° C. with maintaining pH from 9 to 10. The mixture was aged for 1 hour. A precipitate was filtered, washed with water, dried for 10 hours at 80° C., and baked for 3 hours at 600° C. to obtain a powder catalyst. In the powder catalyst, a percentage of metal oxides was 50% by mass, and a percentage of synthetic zeolite was 50% by mass.

(Manufacturing of Film Catalyst)

In a 250 ml polyethylene jar, added were MIBK as a solvent, phenol resin (PR-9480 made by Sumitomo Bakelite Co., Ltd.) as a binder, and the powder catalyst prepared in Manufacturing Example 1 in this order. A mixing ratio was 25 parts by mass of nonvolatile matters of the phenol resin to 75 parts by mass (65 g) of the powder catalyst. MIBK was added in such amount as that a solid content of a composition was 60% by mass. To the polyethylene jar was further added glass beads having a diameter of 1 mm (apparent volume: 65 ml) as a dispersing medium.

The polyethylene jar was set in a paint shaker and subjected to a mixing and dispersing treatment for 30 minutes to obtain a coating composition.

A long copper foil (thickness: 40 μm, basis weight: 310 g/m²) was used as a base material. The coating composition was applied on the copper foil with a comma coater, and treated for 120 seconds at 100° C. in a drying oven installed on the coater to obtain a film catalyst. A catalyst layer having a thickness of 50 μm was formed per side. The total thickness of the catalyst layers and the copper foil was 140 μm. A supported amount of the catalyst layer per side was 63 g/m². A supported amount of the powder catalyst per side was 47 g/m².

(Bending of Film Catalyst)

Film catalysts were prepared with protective materials described below and processed into a wave shape with a device shown in FIG. 1 under conditions in Table 1. A feeding velocity was 2 m/min. The resultant film catalysts having a wave shape were subjected to the following tests. Gears 15 and 16 used in processing had the same shape of 4 mm circular pitch and 2.5 mm tooth depth. Results are shown in Table 1.

Protective material 1: nonwoven fabric of PE (sheath)/PET (core) fiber produced by melt blowing (basis weight: 20 g/m²)

Protective material 2: spunbonded nonwoven fabric Ecule 3151A, Toyobo Co., Ltd. (basis weight: 15 g/m²)

Protective material 3: spunbonded nonwoven fabric Syntex PS104, Mitsui Chemicals, Inc. (basis weight: 20 g/m²)

Protective material 4: spunbonded nonwoven fabric Eleves S1003WDO, Unitika Ltd. (basis weight: 100 g/m²)

Protective material 5: woven fabric of 100% cotton (basis weight: 144 g/m²)

Protective material 6: spunbonded nonwoven fabric Ecule 3A01A, Toyobo Co., Ltd. (basis weight: 100 g/m²)

Protective material 7: spunbonded nonwoven fabric Syntex PS120, Mitsui Chemicals, Inc. (basis weight: 100 g/m²)

Protective material 8: recycled cut paper for PPC 100N, Nippon Paper Group, Inc. (basis weight: 68 g/m²)

Protective material 9: nonwoven fabric of PE (sheath)/PET (core) fiber produced by melt blowing (basis weight: 15 g/m²)

Protective material 10: spunbonded nonwoven fabric of PE (sheath)/PET (core) fiber subjected to a fluorine treatment (basis weight: 70 g/m²).

Protective material 11: pile sheet of PTFE fiber (raising height: 2 mm, basis weight: 510 g/m²)

Protective material 12: twilled fabric of PTFE fiber (Toray Industries, Inc., Toyoflon) (basis weight: 466 g/m²)

Protective material 13: silicone rubber sheet (basis weight: 654 g/m², thickness: 0.55 mm)

Protective material 14: PET film (basis weight: 45 g/m², thickness: 0.03 mm)

(Test for Evaluating a State of Manufacturing)

Test methods were as follows: <processing test 1> the surface of a film catalyst was visually observed before and after processed into a wave shape for comparison; and <processing test 2> the surface of a catalyst material having a protective material got wrinkled was visually observed before and after processed into a wave shape for comparison. Results were evaluated on the rating below. A film catalyst was also evaluated for a running state during <processing test 1>.

<Evaluation of a State of the Surface>

⊚ (Double circle): <processing test 1> no change occurs on the surface of a catalyst layer.

<Processing test 2> no change occurs on the surface of a catalyst layer.

○ (Circle): <processing test 1> no change occurs on the surface of a catalyst layer.

<Processing test 2> a wrinkle is transferred onto the surface of a catalyst layer, but no detachment of the catalyst layer (fall-off of the film) occurs.

x (Cross): <processing test 1> a wrinkle is transferred onto the surface of a catalyst layer, but no detachment of the catalyst layer (fall-off of the film) occurs.

<Processing test 2> the surface of the catalyst layer is not damaged (detached) to cause falling-off of the film.

xx (Double cross): <processing test 1> the surface of the catalyst layer is damaged (detached)

<Processing test 2> the surface of the catalyst layer is damaged (detached)
Evaluation of a State of Running>
○ (Circle): a protective material and a film catalyst run stably Δ (Triangle): a protective material or a film catalyst run with slightly-disordered to slightly meander x (Cross): a protective material or a film catalyst meander and run unstably.

TABLE 1

| | Film catalyst | | Distance between gears (T) (mm) | protective material | | | | | |
|---|---|---|---|---|---|---|---|---|---|
| | base material | Thickness of film catalyst $t_1$ (mm) | | Kind | thickness (mm) | Compressibility (%) | Coefficient of dynamic friction (MIU) | Porosity (%) | The number of layers |
| Example 1 | Copper foil | 0.14 | 0.6 | Protective material 1 | 0.71 | 89 | 0.13 | 96 | One upper and one lower layers |
| Example 2 | Copper foil | 0.14 | 0.6 | Protective material 2 | 0.15 | 61 | 0.17 | 92 | One upper and one lower layers |
| Example 3 | Copper foil | 0.14 | 0.6 | Protective material 3 | 0.19 | 67 | 0.22 | 91 | One upper and one lower layers |
| Example 4 | Copper foil | 0.14 | 0.6 | Protective material 4 | 0.55 | 43 | 0.13 | 90 | One upper and one lower layers |
| Example 5 | Copper foil | 0.14 | 0.6 | Protective material 5 | 0.62 | 57 | 0.18 | 89 | One upper and one lower layers |
| Example 6 | Copper foil | 0.14 | 0.6 | Protective material 2 | 0.15 | 61 | 0.17 | 92 | two upper and two lower layers |
| Example 7 | Copper foil | 0.14 | 0.6 | Protective material 1 | 0.71 | 89 | 0.13 | 96 | Four upper and four lower layers |
| Example 8 | Copper foil | 0.14 | 2.0 | Protective material 11 | 1.24 | 63 | 0.29 | 76 | One upper and one lower layers |
| Example 9 | Copper foil | 0.14 | 0.6 | Protective material 12 | 0.45 | 45 | 0.11 | 57 | One upper and one lower layers |
| Example 10 | Copper foil | 0.14 | 0.6 | Protective material 3 | 0.19 | 67 | 0.22 | 91 | two upper and two lower layers |
| Comparative example 1 | Copper foil | 0.14 | 0.6 | Protective material 6 | 0.41 | 36 | 0.11 | 86 | One upper and one lower layers |
| Comparative example 2 | Copper foil | 0.14 | 0.6 | Protective material 7 | 0.62 | 37 | 0.18 | 83 | One upper and one lower layers |
| Comparative example 3 | Copper foil | 0.14 | 0.6 | Protective material 8 | 0.10 | 36 | 0.25 | 57 | One upper and one lower layers |
| Comparative example 4 | Copper foil | 0.14 | 0.6 | Protective material 10 | 1.51 | 97 | 0.35 | 99 | One upper and one lower layers |
| Comparative example 5 | Copper foil | 0.14 | 0.6 | Protective material11 | 0.35 | 25 | 0.03 | 84 | One upper and one lower layers |
| Comparative example 6 | Copper foil | 0.14 | 0.6 | Protective material13 | 0.55 | 19 | 1.95 | 1.3 | One upper and one lower layers |
| Comparative example 7 | Copper foil | 0.14 | 0.6 | Protective material 14 | 0.03 | 23 | 0.26 | 0 | One upper and one lower layers |

| | protective material | | | Evaluation | | |
|---|---|---|---|---|---|---|
| | Total thickness $t_2$(mm) | $t_2/t_1$ | $t_1 + t_2$ | State of surface | State of running | Observation of state of running |
| Example 1 | 1.42 | 10.14 | 1.56 | ◎ | ○ | Shape of gears is well transferred to form a smooth wave shape. |
| Example 2 | 0.30 | 2.14 | 0.44 | ◎ | Δ | Wave plate has a slightly angular wave shape. The protective material slightly meanders. |
| Example 3 | 0.38 | 2.71 | 0.52 | ◎ | Δ | Wave plate has a slightly angular wave shape. The protective material slightly meanders. |
| Example 4 | 1.10 | 7.86 | 1.24 | ◎ | ○ | State of running is good. |
| Example 5 | 1.24 | 8.86 | 1.38 | ◎ | ○ | |
| Example 6 | 0.60 | 4.29 | 0.74 | ◎ | ○ | |
| Example 7 | 5.68 | 40.57 | 5.82 | ○ | ○ | |
| Example 8 | 2.48 | 17.71 | 2.62 | ○ | Δ | The protective material slightly meanders. |
| Example 9 | 0.90 | 6.43 | 1.04 | ○ | ○ | |
| Example 10 | 0.76 | 5.43 | 0.90 | ◎ | ○ | Shape of gears is well transferred to form a smooth wave plate. |
| Comparative example 1 | 0.82 | 5.86 | 0.96 | X | ○ | |
| Comparative example 2 | 1.24 | 8.86 | 1.38 | X | ○ | |
| Comparative example 3 | 0.20 | 1.43 | 0.34 | X | ○ | |
| Comparative example 4 | 3.02 | 21.57 | 3.16 | ○ | X | State of running is unstable. |
| Comparative | 0.70 | 5.00 | 0.84 | X | ○ | |

TABLE 1-continued

| | | | | | | |
|---|---|---|---|---|---|---|
| example 5 | | | | | | |
| Comparative example 6 | 1.10 | 7.86 | 1.24 | X | X | Protective material and film catalyst meander in starting of running. |
| Comparative example 7 | 0.06 | 0.20 | 0.20 | X | X | Once the protective material and the film catalyst meander, they cannot get back to a stable state. |

The thickness of film catalyst ($t_1$) is the total thickness of the base material and catalyst layers on both sides. Two gears 15 and 16 used in processing have the same shape as each other, having a circular pitch of 4 mm and a tooth depth of 2.5 mm.

The invention claimed is:

1. A method for manufacturing a film catalyst, comprising forming a catalyst layer on one side or each side of a base material to produce a film catalyst and then bending the film catalyst, wherein the bending step is conducted by bending the film catalyst with a bending tool composed of two gears that are oppositely arranged as meshing each other while a protective material having a compressibility of 40 to 95% is inserted between the catalyst layer of the film catalyst and the two gears;

wherein a ratio of the total thickness ($t_2$) of the protective material to the thickness ($t_1$) of the film catalyst, $t_2/t_1$, is 4 to 20, and a distance (T) between the two gears and $t_1$ and $t_2$ satisfy a relationship $t_1<T<t_1+t_2$, wherein T is a distance between the two gears wherein the closest distance of the two gears in the state of a tooth of one gear meeting of the other gear is set to the basing point 0.

2. The method for manufacturing a film catalyst according to claim 1, wherein the protective material has a coefficient of dynamic friction of 0.05 to 0.25.

3. The method for manufacturing a film catalyst according to claim 1, wherein the protective material is a nonwoven fabric.

4. A method for manufacturing a film catalyst, comprising forming a catalyst layer on one side or each side of a base material to obtain a film catalyst and bending the film catalyst by pressing, wherein the bending step is conducted by bending the film catalyst with a bending tool, provided with upper and lower bending plate-like tools having corrugated teeth on flat plates, oppositely arranged for convex parts of the teeth to mate with concave parts, while a protective material having a compressibility of 40 to 95% is inserted between the catalyst layer of the film catalyst and the bending tool.

5. A method for manufacturing a film catalyst, comprising forming a catalyst layer on one side or each side of a base material to produce a film catalyst and then bending the film catalyst, wherein the bending step is conducted by bending the film catalyst with a bending tool composed of two gears that are oppositely arranged as meshing each other while a protective material having a compressibility of 40 to 95% is inserted between the catalyst layer of the film catalyst and the two gears;

wherein the protective material is a nonwoven fabric.

* * * * *